US006791390B2

(12) United States Patent
Gay

(10) Patent No.: US 6,791,390 B2
(45) Date of Patent: Sep. 14, 2004

(54) METHOD OF FORMING A VOLTAGE REGULATOR SEMICONDUCTOR DEVICE HAVING FEEDBACK AND STRUCTURE THEREFOR

(75) Inventor: Michael J. Gay, Vaud (CH)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 155 days.

(21) Appl. No.: 10/156,285

(22) Filed: May 28, 2002

(65) Prior Publication Data

US 2003/0224624 A1 Dec. 4, 2003

(51) Int. Cl.[7] .............................. G05B 6/02; G05F 1/10
(52) U.S. Cl. ....................................... 327/332; 323/225
(58) Field of Search ................................ 323/220, 223, 323/224–226, 265, 266–268, 273–275, 280, 281, 284; 327/306, 316, 324, 331, 332

(56) References Cited

U.S. PATENT DOCUMENTS

| | | | |
|---|---|---|---|
| 5,545,970 | A | 8/1996 | Parkes, Jr. et al. |
| 5,666,044 | A | 9/1997 | Tuozzolo |

*Primary Examiner*—Evan Pert
(74) *Attorney, Agent, or Firm*—Robert F. Hightower

(57) ABSTRACT

In an exemplary embodiment, a system (10) is formed to include a semiconductor device (11) that is formed to function as a voltage regulator. The semiconductor device (11) is formed to have a control loop that includes an amplifier (30) and a feedback transistor (19) that provide a small signal AC gain that varies inversely to a load current of an output transistor (12) in order compensate for the manner in which the output transistor (12) transconductance depends on the load current flowing through the output transistor (12).

20 Claims, 7 Drawing Sheets

10

METHOD OF FORMING A VOLTAGE REGULATOR SEMICONDUCTOR DEVICE HAVING FEEDBACK AND STRUCTURE THEREFOR

BACKGROUND OF THE INVENTION

The present invention relates, in general, to electronics, and more particularly, to methods of forming semiconductor devices and structures therefor.

In the past, the semiconductor industry utilized various design techniques to implement voltage regulators and particularly voltage regulators operating in the linear or continuous time mode. Typically, these linear voltage regulators utilized a series pass output transistor to couple an unregulated input voltage to a regulated output voltage and provide a load current that flowed from the voltage input to the voltage output. The voltage regulator usually had a control loop that included an error amplifier which was utilized for comparing the output voltage to a fixed reference voltage and driving the output transistor to maintain the regulated output voltage at a fixed voltage value. One particular application for such voltage regulators was generally referred to as low drop-out voltage regulators. Low drop-out regulators are characterized by operation with a very small difference between the unregulated input voltage and the regulated output voltage. Typically, the difference is less than about three-fourths of a volt.

One particular problem with low drop-out regulators, was oscillation. Typically, the load that was driven by the low drop-out regulator had a capacitive component. Because of phase lags in the voltage regulator control loop, oscillations tended to develop in the regulated output voltage. One method for stabilizing such control loops was to add a resistor and capacitor network in parallel with the control electrode of the output transistor. The network degraded AC parameters such as ripple rejection on the unregulated input voltage at low current levels.

Accordingly, it is desirable to have a voltage regulator having a control loop that minimizes oscillation. tendency, that provides a damping effect that assists in minimizing oscillations, and that has a wide operating range of load current without degrading regulation provided by the voltage regulator.

BRIEF DESCRIPTION OF THE DRAWINGS

For simplicity and clarity of illustration, elements in the figures are not necessarily to scale, and the same reference numbers in different figures denote the same elements. Additionally, descriptions and details of well known steps and elements are omitted for simplicity of the description.

DETAILED DESCRIPTION OF THE DRAWINGS

It is believed that the transconductance of a series pass output transistor is dependent on the value of the load current passing through the transistor, that is, the transconductance varies as the value of the load current changes. In general, the damping factor of previous voltage regulator control loops usually varied inversely with the transconductance of the output transistor. Because the load current may vary over a wide range, both the output transistor transconductance and correspondingly, the damping factor of the control loop varied as the load current varied. In most systems, the load current may have a variation of 100:1. Since the damping factor affects the control loop stability, the regulator output could oscillate or have poor regulation at different times as the load current varied. Because of these transconductance and associated damping factor changes, a circuit that is stable for one set of component values may become more unstable as the load current changes. Consequently, it can be seen that it is important for a voltage regulator control loop to have a damping factor that does not vary with the load current and that is stable over a wide range of load currents. The descriptions hereinafter include a method of forming a system having a voltage regulator that includes, among other features, operation over a wide range of load currents, improved stability over the wide load current range, a control loop formed to have a damping factor that does not vary with the load current and that minimizes the oscillation tendency in the regulated voltage, operation that minimizes ripple current in the output voltage, and an amplifier formed to have a small signal AC open loop gain that varies inversely with the gain of the device forming the load current.

Figure 1:
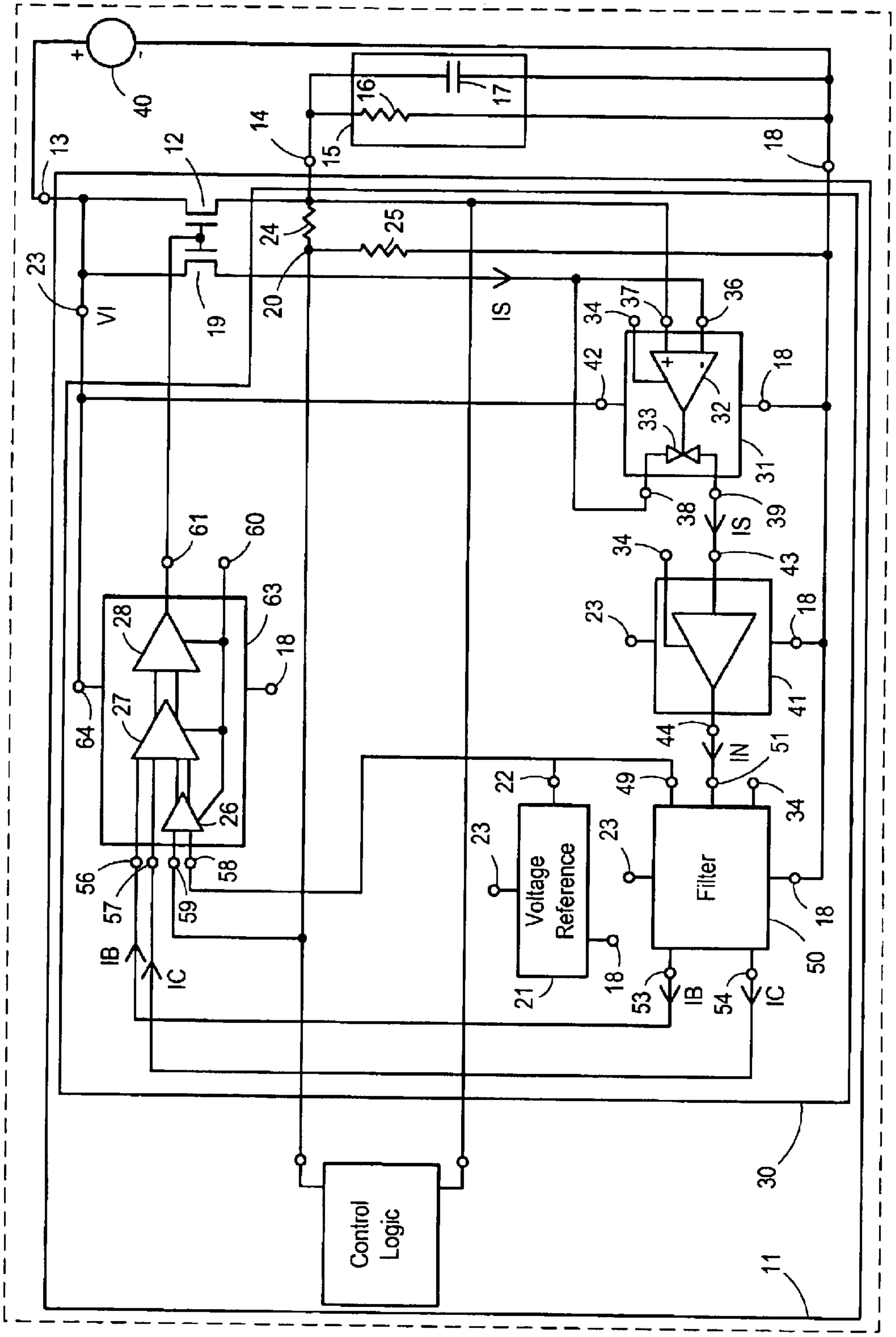
FIG. 1 schematically illustrates a functional diagram of a portion of an embodiment of a system that includes a voltage regulator in accordance with the present invention.

FIG. 1 schematically illustrates a functional diagram of an embodiment of a system 10, illustrated by a dashed box, that includes a voltage regulator 11. Along with regulator 11, system 10 typically includes an unregulated voltage source 40 and a load 15 that has both a resistive component and a capacitive component, illustrated respectively by a resistor 16 and a capacitor 17. Voltage regulator 11 includes an amplifier 30 and may also have control logic that functions to control the start-up of regulator 11 and to assist in minimizing damage from over voltage and excessive current conditions.

Regulator 11 also includes an output transistor 12 that receives the unregulated voltage on a voltage input 13 and produces a regulated output voltage on a voltage output 14. Load current flows from input 13 through transistor 12 to load 15 connected to output 14. A sense transistor 19 is formed to generate a sense current that is representative of the load current flowing through transistor 12. Transistors 12 and 19 both have a first current carrying electrode connected to voltage input 13, and control electrodes that are connected together and driven by amplifier 30. Output transistor 12 has a second current carrying electrode connected to output 14 to provide the output voltage and the load current. Sense transistor 19 has a second current carrying electrode that generates the sense current that is utilized by amplifier 30 as will be seen in more detail hereinafter. In some embodiments, transistors 12 and 19 may be external to regulator 11. An internal voltage (VI) of regulator 11 is formed on an internal voltage node 23 that is connected to voltage input 13. The internal voltage (VI) on node 23 generally is utilized to provide power to the elements of regulator 11 including amplifier 30. In some embodiments, some of the internal elements of regulator 11 may receive power from a separate voltage source such as a bandgap regulator. A power return 18 functions to return power back to the source connected to input 13.

Amplifier 30, transistor 12, and transistor 19 form a control loop of regulator 11. Transistor 19 provides output sampling information that is provided to amplifier 30 which uses the sampling information to provide control signals to transistor 12 thereby completing the control loop. The control loop has a gain derived from the product of the transconductance of transistor 12 and the gain of the combination of amplifier 30 and transistor 19. Thus, amplifier 30 and sense transistor 19 function as a control loop amplifier that is a portion of the control loop of amplifier 30, transistor 12, and transistor 19. As will be seen hereinafter, the control loop amplifier is formed to have a small signal AC gain that varies inversely to the load current flowing through transistor 12, thus, varying inversely to the transconductance of transistor 12 which varies with the load current. Thus, such a small signal AC gain compensates for transistor 12 transconductance dependence on the load current. Amplifier 30 is formed to have elements of the control loop including an equalizer 31, a current amplifier 41, a filter 50, and an error amplifier 63. Amplifier 30 also includes a voltage reference 21. Equalizer 31, current amplifier 41, voltage reference 21, filter 50, and amplifier 63 are connected to node 23 and return 18 to receive power from the internal voltage (VI) provided by regulator 11. Equalizer 31, current amplifier 41, voltage reference 21, filter 50, and amplifier 63 also receive a bias voltage on bias inputs 34 from a bias output 60 of error amplifier 63. Such bias voltages and use of bias transistors is well known to those skilled in the art. A feedback voltage of amplifier 30 is formed at a feedback node 20. The feedback voltage is formed to be representative of the output voltage on output 14. In the preferred embodiment, the feedback voltage is formed by a resistor divider comprised of a first resistor 24 that is connected in series with a second resistor 25 between output 14 and power return 18. Those skilled in the art understand that the feedback voltage may be formed by other circuit elements. In other embodiments, resistors 24 and 25 may be external to amplifier 30.

Voltage reference 21 of amplifier 30 receives the internal voltage from node 23 and forms a reference voltage on reference output 22. Voltage reference 21 is any one of several designs that are well known to those skilled in the art. In the preferred embodiment, reference 21 is a bandgap reference. Amplifier 30 is formed to provide the control loop amplifier with a small signal AC gain that varies inversely with the transconductance of the output device, driven by amplifier 30. As a result, the operation of regulator 11 is more stable and, oscillation is minimized thereby improving regulation, minimizing ripple currents in the load current, and providing a wider range of operating load currents. In the preferred embodiment, the oscillations are substantially eliminated. The output device may be a junction bipolar device, an MOS device, a HEMT device, an HBT device, or other semiconductor device. The relationship of the transconductance to the load current is different for each type of device, thus the exact small signal AC gain provided by the control loop amplifier may vary for each type of device. For example the transconductance of MOS output transistors vary as the square root of the load current while bipolar transistor transconductance varies proportionally to the load current. Consequently, the small signal AC gain of the control loop amplifier is formed to vary approximately inversely as the Nth root of the load current. For an MOS transistor 12, the small signal AC gain of the control loop amplifier is formed to vary approximately inversely as the fourth root of the load current and for a bipolar transistor 12, the small signal AC gain is formed to vary approximately inversely as the square root of the load current.

Figure 2:
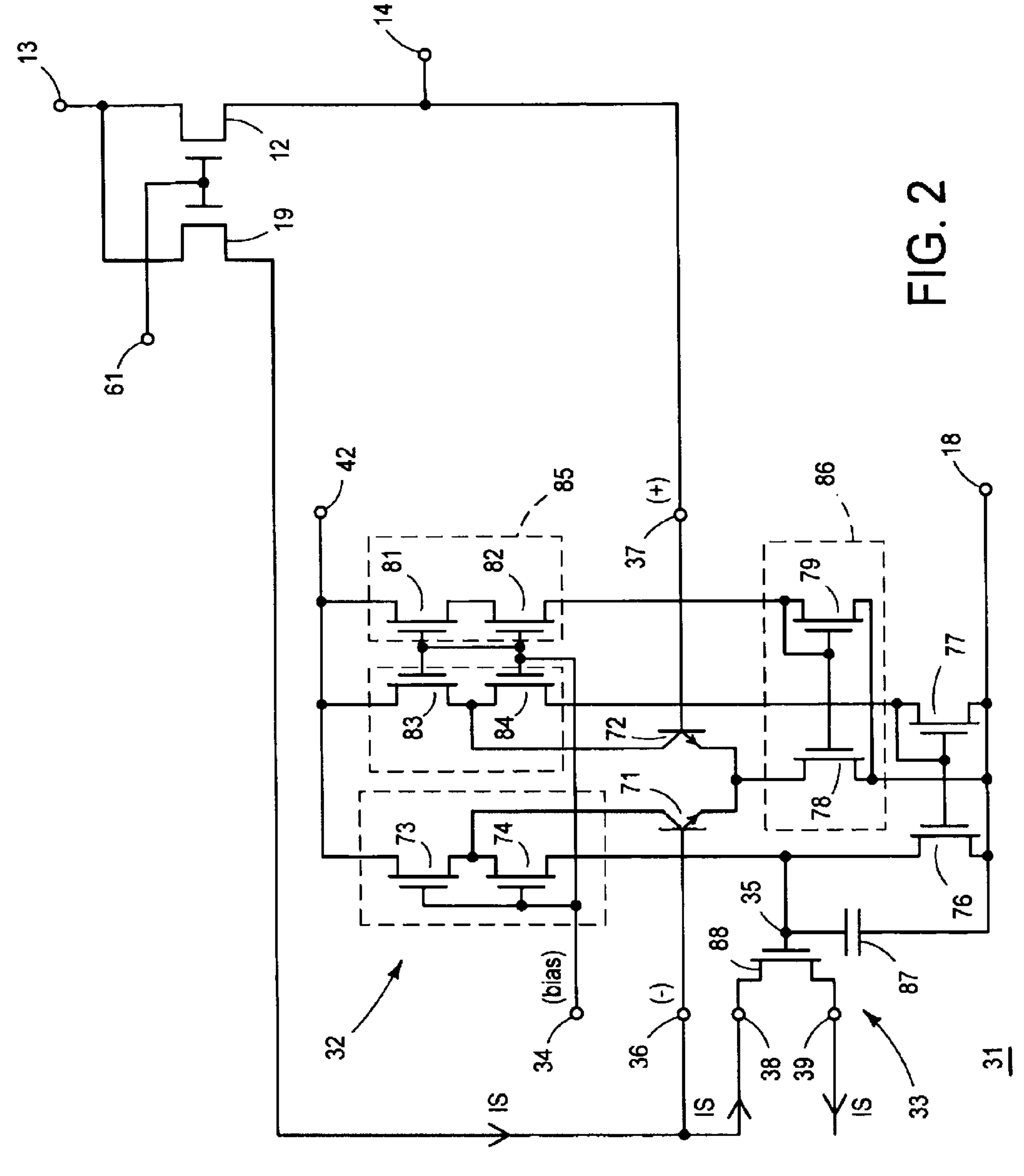
FIG. 2 schematically illustrates a preferred embodiment of a portion of one of the functional blocks illustrated in FIG. 1 according to the present invention.

FIG. 2 schematically illustrates the preferred embodiment of a portion of equalizer 31 that is shown in FIG. 1. Transistors 12 and 19 are also illustrated for convenience of the description. Additionally, some references are made to FIG. 1 for clarity of the explanation. Equalizer 31 includes an equalizer amplifier 32 and voltage adjuster device 33 (See FIG. 1), both of which are generally identified in FIG. 2 by an arrow. In this preferred embodiment, adjuster device 33 is implemented by a pass transistor 88. In other embodiments, adjuster device 33 may have a different configuration as long as the embodiment provides the functions of adjuster device 33 and equalizer 31 as described hereinafter. Equalizer 31 applies an image voltage to the control electrode of sense transistor 19. Equalizer 31 controls or adjusts the image voltage to approximately equal or equal as nearly as possible the output voltage provided by output transistor 12. In the preferred embodiment, the difference between the image voltage and the output voltage is the offset voltage of equalizer amplifier 32. Transistors 12 and 19 are rationed so that the sense current is a fraction of the load current. The ratio is selected to provide a usable sense current value without unduly increasing the current consumption and power dissipation of regulator 11. In the preferred embodiment, the ratio is 720:1. Since the current flowing through transistors 12 and 19 typically vary varies as a function of the voltage between the current carrying electrodes, equalizer 31 maintains the image voltage approximately equal to the output voltage in order to ensure that the sense current (IS) passing through transistor 19 is representative, according to the ratio, of the load current passing through transistor 12. Since other portions of amplifier 30 are formed to use the same current as a representation of the load current, it is important that equalizer 31 maintain the image voltage approximately equal to the output voltage. Thus, equalizer 31 controls or adjusts the image voltage of sense transistor 19 responsively to the output voltage.

Equalizer 31 has a power input 42 that is used to supply operating power to equalizer 31. In the preferred embodiment, power input 42 is connected to internal voltage node 23. A differential amplifier 32, generally indicated by an arrow, of equalizer 31 receives the output voltage on a positive input 37, and receives the image voltage on a negative input 36 of amplifier 32. Transistor 88 is driven by amplifier 32 to maintain the desired image voltage and to also pass the sense current through transistor 88. Equalizer 31 receives the sense current (IS) from sense transistor 19 on a sense current input 38, passes the sense current through transistor 88, and provides the sense current on a sense current output 39. Transistor 88 has a first carrying electrode connected to sense current input 38, a second carrying electrode connected to output 39, and a control electrode connected to a balanced current node 35.

Amplifier 32 is formed to have a differential transistor pair, transistors 71 and 72, that receives the image voltage and output voltage, respectively. Transistors 71 and 72 are biased by the current sunk by a current mirror 86, generally illustrated by a dashed box, comprising transistors 78 and 79. Current mirror 86 receives a current input from a current source 85, generally illustrated by a dashed box, formed by transistors 81 and 82 which are serially connected to power input 42. Transistors 71 and 72 both have a first current carrying electrode connected to the first current carrying electrode of current source transistor 78, and control electrodes connected to inputs 36 and 37, respectively to receive the image voltage and output voltage, respectively. Transistors 71 and 72 provide a differential output received by transistors 74 and 84, respectively. Transistor 74 is biased by a current source 73 and reflects the value of the output of transistor 71 to transistor 88 at balanced current node 35. The output of transistor 72 is coupled to transistor 88 through transistor 84 and through a current mirror comprising transistors 77 and 76. A compensation, capacitor 87 is connected between node 35 and return 18 and functions to stabilize the negative feedback loop configuration of amplifier 32 and transistor 88.

One advantage of equalizer 31 is that it operates correctly even when the output voltage applied to input 37 is equal to the voltage applied to power input 42, a condition which is approached when the regulator operates with the minimum drop-out voltage. Typically the minimum drop-out voltage is about one hundred Milli-volts (100 MA) and usually is less than seven hundred fifty Milli-volts (750 MA).

The operation of equalizer 31 is facilitated by having a second current carrying electrode of transistor 78 connected to return 18 and a control electrode connected to both a control electrode and a first current carrying electrode of transistor 79. A second current carrying electrode of transistor 79 is connected to return 18. Transistor 82 has a first current carrying electrode connected to the first current carrying electrode of transistor 79, and a second current carrying electrode connected to a first current carrying electrode of transistor 81. A control electrode of current source 73 and 83 in addition to a control electrode of transistors 74, 81, 82, and 84 is connected to bias input 34. A second current carrying electrode of transistor 81 is connected to a first current carrying electrode of the transistors of sources 73 and 83, and to power input 42. A second current carrying electrode of the transistors of sources 73 and 83 is connected to a first current carrying electrode of transistors 74 and 84, respectively. A second current carrying electrode of transistors 74 and 84 is connected to a first current carrying electrode of transistors 76 and 77, respectively. The first current carrying electrode of transistor 77 is also connected to a control electrode of transistors 76 and 77. A second current carrying electrode of transistors 76 and 77 is connected to return 18. Transistor 88 receives the balanced output of amplifier 32 which drives transistor 88 to maintain the voltage on input 38 approximately equal to the voltage on output 14. Node 35 is connected to a first terminal of capacitor 87 and to a control electrode of transistor 88, to the second current carrying electrode of transistor 74, and to the first current carrying electrode of transistor 76. A second terminal of capacitor 87 is connected to return 18. Transistor 88 has a first current carrying electrode connected to input 38 and a second current carrying electrode connected to output 39.

Equalizer 31 may may take the form of other embodiments as long as transistor 19 is controlled to have a sense current that is representative of the load current under all operating conditions. For example transistor 88 can be a bipolar transistor instead of an MOS transistor or transistors 71 and 72 could be MOS transistors instead of bipolar transistors.

Figure 3:
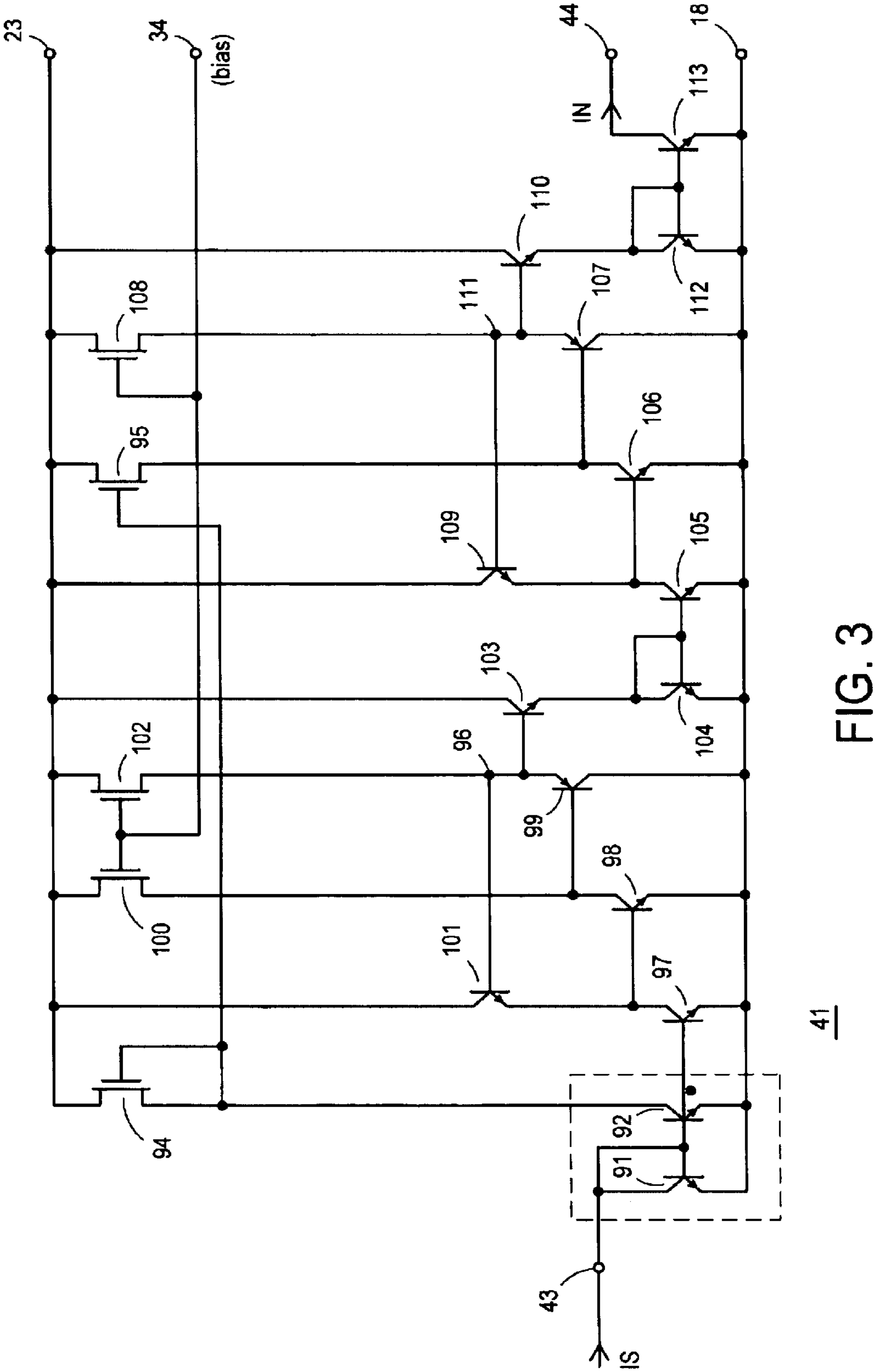
FIG. 3 schematically illustrates an embodiment of a portion of another of the functional blocks illustrated in FIG. 1 according to the present invention.

FIG. 3 schematically illustrates an embodiment of current amplifier 41 that is shown in FIG. 1. Amplifier 41 is formed as a non-linear current amplifier that has a small signal gain that varies inversely with load current in a manner adapted to the variation of the transconductance of transistor 12 with current. The small signal gain of amplifier 41 varies inversely as an Math root of the sense current (IS) received on input 43. It can be mathematically shown that the compensated current (IN) provided at output 44 varies as the Math root of the sense current (IS) received at input 43 which produces the desired dependence of the small-signal gain of amplifier 41 on the sense current (IS) received on input 43. Because the sense current (IS) represents the load current multiplied by the scaling factors between transistors 12 and 19, the compensated current (IN) at output 44 varies approximately as the Math root of the load current through transistor 12. For the embodiment of an MOS transistor 12, the compensated current (IN) at output 44 preferably varies as the three-fourths root of the load current through transistor 12. For the embodiment illustrated in FIG. 3 amplifier 41 has a transfer function expressed by:

$$IN=k[\text{3/4 root of }(IS)]=k[\text{3/4 root of }[(r)(IL)]]$$

where

IN=compensated output current of amplifier 41;

IS=sense current provided by transistor 19 and equalizer 31;

IL=load current flowing through transistor 12;

k=proportionality constant of amplifier 41; and r=ratio of sense current (IS) to load current (IL).

Differentiating the above equation provides the small-signal gain of amplifier 41 as:

$$GM=(\mathrm{dIN})/(\mathrm{dIS})=[(3/4)k][1/[\text{1/4 root of }(IS)]]$$

where;

GM the small signal gain of amplifier 41;

dIN incremental change in IN; and dIS=incremental change in IS.

Consequently, the small signal gain of amplifier 41 varies inversely as the one-fourth root of the load current flowing through transistor 12.

Amplifier 41 forms this relationship through the interconnections of the transistors forming amplifier 41. The embodiment illustrated in FIG. 3 includes bipolar transistors 91, 92, 97, 98, 99, 101, 103, 104, 105, 106, 107, 109, 110, 112, and 113, along with MOS transistors 94, 95, 100, 102, and 108. Other transistor structures may be used as long as they implement the same gain to transconductance relationship provided by amplifier 41. The sense current (IS) from equalizer 31 is received by diode connected transistor 91 which reflects equal currents representing the sense current (IS) through equal sized current mirror connected transistors 92 and 97. Transistor 91 is rationed to transistors 92 and 97 so that current flowing through transistors 92 and 97 are smaller than the current flowing through transistor 91. This and the choice of bias currents and device sizes determines the ratio k shown in the previous equations for amplifier 41. In the preferred embodiment, the ratio is 8:1 in order to allow small bipolar transistors to operate close to their ideal current/voltage characteristics and to minimize the current consumption of regulator 11. Thus, transistors 92 and 97 receive a current that is representative of the load current but rationed by the two ratios of transistor 12 to 19 and of transistor 91 to transistors 92 and 97. Transistors 97, 98, 99, and 101 function as a feedback loop so that transistor 101 is forced to provide the current that flows through transistor 97. Transistors 100 and 102 are current sources that supply current to transistors 98 and 99, respectively, and are biased by the bias voltage supplied on bias input 34. Consequently, the current through transistors 98 and 99 is essentially constant. Transistors 98, 101, 103, and 104 are formed to be the same size. Transistor 97 acts as a current source and provides an input to the feedback loop. Starting at a node 96 and summing the branch voltages shows that the voltage from node 96 via the base-emitter junctions of transistors 101 and 98 to power return 18 must equal the voltage from node 96 via the base-emitter junctions of transistors 103 and 104 to return 18. Since all of these transistors are bipolar transistors and are the same size, the bipolar transistor exponential characteristic requires that the product of the emitter currents of transistors 98 and 101 must equal the product of the emitter currents of transistors 103 and 104. The current which flows in transistor 104, and hence its emitter current is, however, essentially equal to the emitter current of transistor 103. Therefore, the current through transistors 103 and 104 will closely approximate the square root of the product of the current through both transistors 98 and 101. The current through transistor 98 is essentially constant and equal to the current supplied by current source coupled transistor 100. It follows then that the current through transistors 103 and 104 must vary as the square root of the current through transistor 101. Since the current through transistor 101 is the current sourced by transistor 97, thus, the current through transistors 103 and 104 varies as the square root of the current drawn by transistor 97.

The current through transistor 103 is coupled to transistor 105 by the current mirror formed by transistor 105 and diode connected transistor 104. Transistors 105, 106, 107, and 109 function similarly to transistors 97, 98, 99, and 101. Also, transistor 108 forms a constant current that flows through transistor 107 similarly to transistor 99. However, transistor 95 has a current that is equal to that flowing through transistor 92 due to the current mirror formed by transistors 94 and 95, and this current is essentially equal to the current flowing through transistor 97. Thus, the current flowing through transistor 106 is the same current value that is flowing through transistor 97. Summing the branch voltages starting at a node 111, similarly to the summations from node 96, shows that the product of the currents through transistors 110 and 112 equals the product of the currents through transistors 106 and 109. The current through transistor 109 is that drawn by transistor 105 which matches that through transistors 103 and 104 which, as was shown above, varies as the square root of that drawn by transistor 97. The current through transistor 106 is forced by the negative feedback loop comprising transistors 106, 107, and 109 to match that sourced by transistor 95, which matches that drawn by transistor 97. The product of the currents through transistors 110 and 112 therefore varies proportionally to the product of the current through transistors 97 and its square root, that is as the current through transistor 97 raised to the power 3/2. Since the current through transistors 110 and 112 are equal, it follows that they vary according to the current flowing through transistor 97 raised to the square root of 3/2, thus, vary as the current flowing through transistor 97 raised to the power ¾. Since the current flowing through transistor 97 is representative of the load current, the compensated current (IN) formed on output 44 is representative of the three-fourths root of the load current as shown hereinbefore in the equations for amplifier 41.

Although FIG. 3 illustrates amplifier 41 with a certain combination of bipolar and MOS transistors, the transistor configurations may be changed. For example the MOS current sources may be bipolar and the PAP transistors could be P-Channel MOS transistors. Bipolar transistors 98, 101, 103, 104, 106, 109, 110, and 112 can be replaced by corresponding MOS transistors provided that they are operated in a region that matches the bipolar exponential current to control voltage relationship, such as operating in the sub-threshold region. Other variations will be recognized by those skilled in the art.

In order to facilitate these relationships of amplifier 41, transistor 91 is formed to have a control electrode and a first current carrying electrode coupled to input 43 and a second current carrying electrode connected to return 18. Transistor 92 has a control electrode connected to input 43, a first current carrying electrode connected to return 18, and a second current carrying electrode connected to a control electrode and a first current carrying electrode of transistor 94 in addition to a control electrode of transistor 95. A second current carrying electrode of transistor 94 is connected to node 23. One of the negative feedback loops is implemented by connecting a control electrode of transistor 97 to the control electrode of transistor 91, a first current carrying electrode of transistor 97 to return 18, and a second current carrying electrode of transistor 97 to a control electrode of transistor 98 and a first current carrying electrode of transistor 101. The feedback loop is further developed from a connection from a first current carrying electrode of transistor 98 to return 18, and a second current carrying electrode connected to a control electrode of transistor 99 and a first current carrying electrode of transistor 100. A first current carrying electrode of transistor 99 is connected to return 18, while a second current carrying electrode is connected to a control electrode of transistor 103, to a control electrode of transistor 101, and to a first current carrying electrode of transistor 102. Transistor 103 has a first current carrying electrode connected to the control electrode and the first current carrying electrode of transistor 104 in addition to a control electrode of transistor 105. A second current carrying electrode of transistor 104 is connected to return 18. Transistor 105 has a first current carrying electrode connected to a control electrode of transistor 106 and a first current carrying electrode of transistor 109, while a second current carrying electrode of transistor 105 is connected to return 18. Transistor 106 has a first current carrying electrode connected to return 18 while a second current carrying electrode is connected to the control electrode of transistor 107 and to a first current carrying electrode of transistor 95. The second feedback loop is further facilitated by a connection from a first current carrying electrode of transistor 107 to return 18, while a second current carrying electrode is connected to a first current carrying electrode of transistor 108 and to the control electrode of transistors 109 and 110. The output of amplifier 41 is formed by connecting the first current carrying electrode of transistor 110 to a control electrode and first current carrying electrode of transistor 112 and a control electrode of transistor 113. Transistor 113 has a first current carrying electrode connected to output 44. The second current carrying electrode of transistors 112 and 113 is connected to return 18. A control electrode of transistors 100, 102, and 108 are connected to bias input 34. Additionally, a second current carrying electrode of transistors 94, 101, 100, 102, 103, 109, 95, 108, and 110 is connected to node 23.

Figure 4:
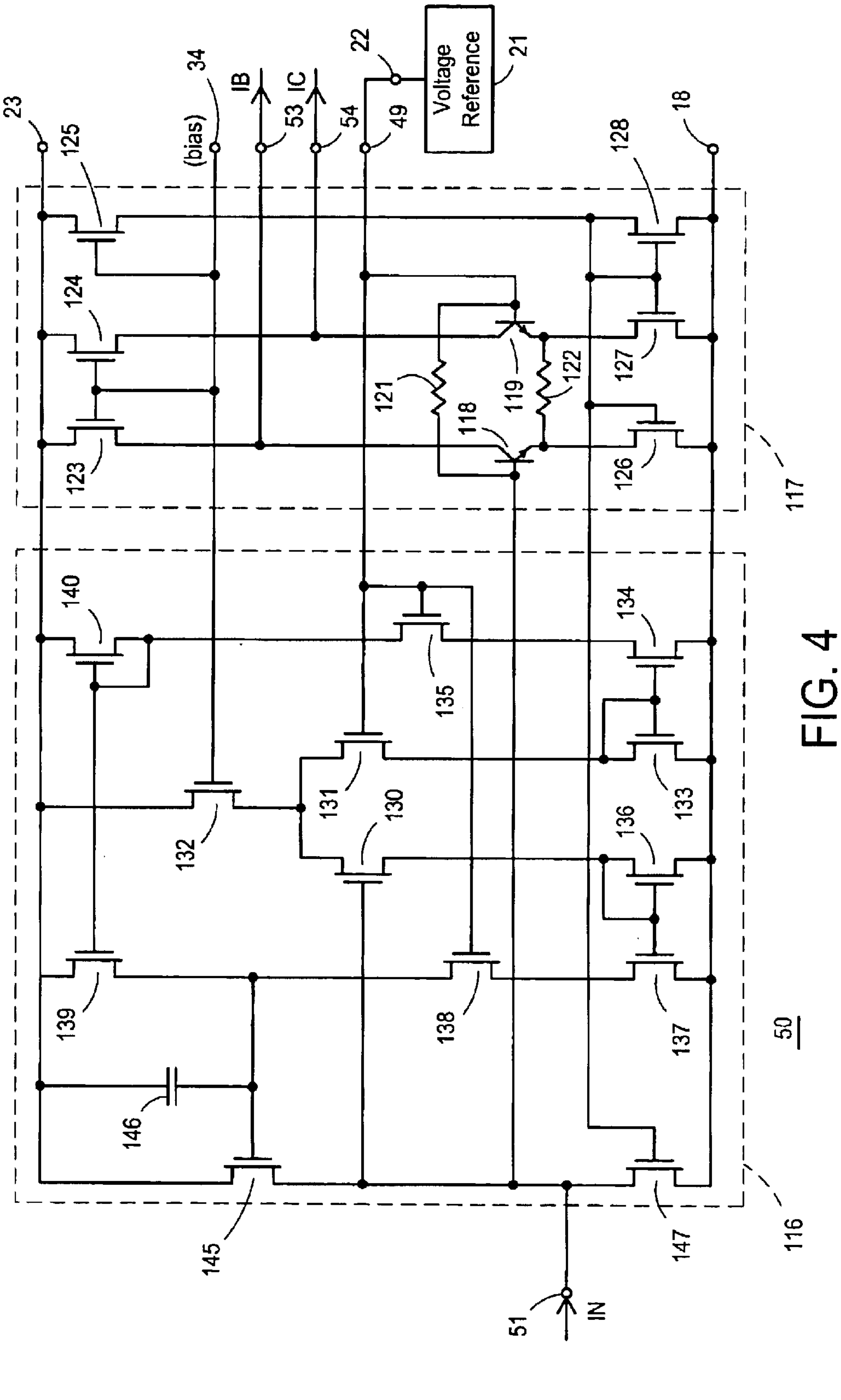
FIG. 4 schematically illustrates a preferred embodiment of a portion of a different one of the functional blocks illustrated in FIG. 1 according to the present invention.

FIG. 4 schematically illustrates the preferred embodiment of filter 50 shown in FIG. 1. Voltage reference 21 is also shown for clarity of the explanation. Filter 50 is formed as a high-pass filter that has a cut-off frequency that varies esponsively to the average value of the load current. Filter 50 receives the compensated current (IN) from amplifier 41 and blocks variations in the compensated current that occur at rates below the cut-off frequency, including dc values, and passes variations that occur at rates above the cut-off frequency. Filter 50 is formed to receive the non-balanced compensated current (IN) on a current input 51 and to generate a balanced current (IB.) and a complementary current (IC) on outputs 53 and 54, respectively. Filter 50 includes a blocking section 116 and a high pass section 117, both generally illustrated by a dashed boxes. Blocking section 116 blocks signals having a frequency component that is below the cut-off frequency of filter 50, including dc voltages and currents. Section 117 passes signals having a frequency component above the cutoff frequency of filter 50.

The compensated current (IN) from amplifier 41 is received at input 51 and is coupled through a resistor 121 to create a differential voltage across resister 121. The differential voltage is coupled to the inputs of the differential pair of transistors 130 and 131 producing differential currents through transistors 130 and 131. A transistor 132 functions as a constant current source for transistors 130 and 131. The current through transistor 130 is reflected by a current mirror of transistors 136 and 137 to the input of transistor 145 via a transistor 138 connected in the cascade configuration. The current through transistor 131 is reflected by a current mirror of transistors 133 and 134, a transistor 135 connected in the cascade configuration, and the current mirror of transistors 140 and 139 to the input of transistor 145. The combination of current mirrors converts the differential output from transistors 130 and 131 to a single-ended current suitable for controlling the control electrode of transistor 145. Cascade transistors 135 and 138 have the control electrode biased from the reference voltage and thus provide a constant and matched output voltage for the current mirrors of transistors 133/134 and 136/137 thereby eliminating dc offsets and sensitivity to variations of tile unregulated voltage at node 23.

Transistor 145 supplies current to input 51 and thus, to output 44 of amplifier 41. Transistor 145 is designed to supply the average current drawn by amplifier 41. An integrating capacitor 146 is connected from node 23 to the input of transistor 145. Capacitor 146 in combination with resistor 121 and the transconductance of transistor 145 and the amplifier comprising transistors 130 and 131 determines the cut-off frequency of filter 50. Thus, blocking section 116 forms a first order low-pass filter that passes the frequency variations below the cut-off frequency back to input 51 and blocks them from affecting the output of filter 50. As illustrated in FIG. 4, transistor 145 is an MOS transistor and therefore has a transconductance that varies as the square root of the current supplied by transistor 145. Since it is supplying a current back to amplifier 41 that varies as the three-fourths root of the load current, then the transconductance of transistor 145 varies as the three-eights root of the load current, thus, the low-pass filter cut-off frequency also varies approximately as the three-eights root of the average value of the load current. Due to manufacturing and design tolerances may prevent the cut-off frequency from equaling the three-eights root, but it generally is within five, per-cent (5%). It can be mathematically shown that the cut-off frequency of the filter of section 116 can be expressed as:

$$FC=1/[(GA)\times(G\mathbf{145})\times(R\mathbf{121})\times(2)\times(PI)\times(C)]$$

where

FC=low pass filter cut-off frequency;

C=Capacitance of capacitor 146;

GA=Transconductance of the amplifier formed by transistors 130 and 131;

G145=transconductance of transistor 145;

R121=resistance of resistor 121; and

PI=value of pi.

It is explained below that the low-pass filter of section 116 and in combination with section 117 provides filter 50 with a high-pass filter characteristic with a cutoff frequency equal to the low-pass cut-off of the filter of section 116. In most cases and to obtain the best performance, the high-pass cut-off frequency should be about one fifth of the cut-off frequency of the main control loop. The latter varies as the fourth root of the load current, if the load transistor is an MOS, whereas the high-pass cut-off varies as the load current to the power ⅜. It follows that if the high-pass cut-off frequency of filter 50 is optimized for the maximum load current it will be slightly below the optimum for low load currents. The small degradation in performance that this produces does not usually justify the complication of generating precise tracking.

The amplifier of transistors 130 and 131 may operate with some offset due to process tolerances. This offset will result in a current through resistor 121 which might oppose and exceed the current drawn by transistor 113 of amplifier 41 when the load current is very low. In the preferred embodiment, transistor 147 is included in order to sink a small current (typically about one micro-amp) in order to ensure that the total current sunk at input 51 will always suffice to accommodate any such offset.

The functionality of blocking section 116 is facilitated by having input 51 connected to a control electrode of transistor 130 and to the first current carrying electrode of transistor 147 in addition to a first current carrying electrode of transistor 145. The first current carrying electrode of transistor 130 is connected to the first current carrying electrodes of transistors 131 and transistor 132, while a second current carrying electrode of transistor 130 is connected to a first current carrying electrode of transistor 136 and to a control electrode of both transistors 136 and 137. A control electrode of transistor 131 is connected to reference input 49 and to a control electrode of transistors 135 and 138. A second current carrying electrode of transistor 131 is connected to a first current carrying electrode of transistor 133 and to a control electrode of both transistors 133 and 134. A first current carrying electrode of transistor 134 is connected to a first current carrying electrode of transistor 135. Transistor 135 additionally has a second current carrying electrode connected to a first current carrying electrode and a control electrode of transistor 140 in addition to a control electrode of transistor 139. Transistor 139 has a first current carrying electrode connected to a control electrode of transistor 145, a first terminal of capacitor 146, and a first current carrying electrode of transistor 138. A second current carrying electrode of transistor 138 is connected to a first current carrying electrode of transistor 137. A second current carrying electrode of transistors 147, 137, 136, 133, and 134 is connected to return 18. A second current carrying electrode of transistors 145, 139, 132, and 140 in addition to a second terminal of capacitor 146 connected to node 23.

Referring to pass section 117, the voltage variations across resistor 121 are also coupled to the inputs of transistors 118 and 119 and create a differential current through the transistors. The voltage variations across resistor 121 are the input signal to low-pass filter 50. It can be mathematically shown that the differential output current flowing through transistors 118 and 119 must then have a high-pass filter characteristic with a high-pass cutoff frequency equal to the low-pass cut-off frequency of filter 50. Thus the input current (IN) is high-pass filtered, amplified by the gain of pass section 117 and coupled to outputs 53 and 54 as the balanced and complementary currents, respectively. Transistors 118 and 119 are biased by currents drawn by transistors 126 and 127, respectively, which, in turn are biased by diode-connected transistor 128 which receives a current provided by the current source connected transistor 125 which is controlled by the bias voltage applied to input 34. The collector currents of transistors 118 and 119 are compensated by currents sourced by transistors 123 and 124 respectively, which are also biased by the bias voltage applied to input 34, so that the average current absorbed at outputs 53 and 54 is nominally zero. This simplifies the design of error amplifier 63 to which these outputs are coupled.

Pass section 117 has a control electrode of transistor 118 connected to input 51 and to a first terminal of transistor resistor 121. A first current carrying electrode of transistor 118 is connected to a first terminal of resistor 122, and a first current carrying electrode of transistor 126. A second current carrying electrode of transistor 118 is connected to a first current carrying electrode of transistor 123 and to output 53. Differential pair transistor 119 has a control electrode connected to reference input 49, to a control electrode of transistor 131, and to the second terminal of resistor 121. Transistor 119 also has a first current carrying electrode connected to a second terminal of resistor 122 and a first current carrying electrode of transistor 127. Transistor 119 also has a second current carrying electrode connected to a first current carrying electrode of transistor 124 and to output 54. Transistor 128 has a control electrode and a first current carrying electrode connected to a control electrode of transistors 127, 126, and 147, and to a first current carrying electrode of transistor 125. Transistors 126, 127, and 128 have the electrical connection completed by having a second current carrying electrode of each transistor connected to return 18. Transistors 123, 124, 125, and 132 all have control electrodes connected to bias input 34, and a second current carrying electrode connected to node 23.

Figure 5:
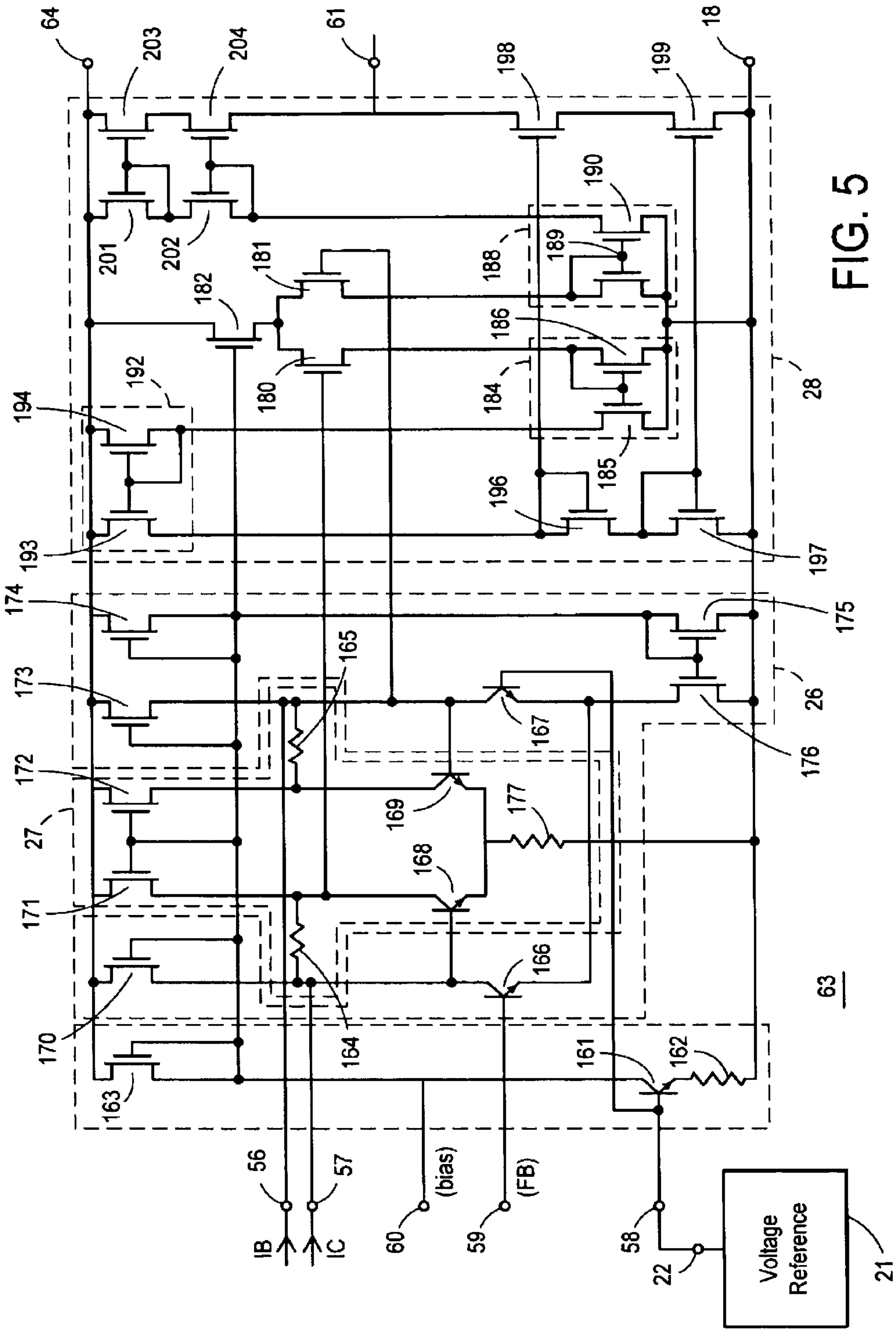
FIG. 5 schematically illustrates a preferred embodiment of a portion of another one of the functional blocks illustrated in FIG. 1 according to the present invention.

FIG. 5 schematically illustrates a preferred embodiment of a portion of error amplifier 63 shown in FIG. 1. Amplifier 63 is formed to provide two primary functions. Amplifier 63 provides a drive voltage to transistor 12 that assists in maintaining the output voltage at a fixed value relative to the reference voltage and amplifier 63 adjusts the drive voltage by the compensation provided by amplifier 41 in order to provide the control loop amplifier with a small signal AC gain that varies inversely to the load current flowing in transistor 12, in a determined manner and hence inversely as the transconductance of transistor 12. The drive voltage has a large voltage excursion and can range from the value of the voltage applied to a power input 64 to the value on return 18. Typically, input 64 is connected to node 23 and the drive voltage ranges from the internal voltage value to the value on return 18. Amplifier 63 adjusts the drive voltage by modifying the drive voltage relative to the currents received from filter 50. Thus, amplifier 63 is formed to drive transistors 12 and 19 responsively to the feedback voltage and to the balanced load current, represented by the inputs from filter 50, that are received by amplifier 63. Amplifier 63 is formed to include a transconductance amplifier stage 26, a trans impedance amplifier stage 27, and a drive amplifier 28, all illustrated generally by dashed boxes. Transconductance amplifier stage 26 receives the feedback voltage and the reference voltage from inputs 59 and 58, respectively, and provides balanced output currents that are responsive to the output voltage on output 14 to assist in maintaining the output voltage at a fixed value relative to the value of the reference voltage.

Trans impedance amplifier stage 27 receives the balanced (IB.) and complementary (IC) current outputs of filter 50 and the balanced output currents from stage 26 on inputs 56 and 57. Since the magnitude of any AC current components in the balanced (IB.) and complementary (IC) currents received from filter 50 by amplifier 63 in response to variations in the load current tends to vary inversely to the average load current, trans impedance amplifier stage 27 forms corresponding AC voltages that tend to modulate the drive to transistor 12 to a lesser extent when the load current is high and to a greater extent when the load current is low.

It can be mathematically shown that this relationship between the compensated current (IN) and the load current through transistor 12 provides the control loop, thus provides regulator 11, a damping factor for the closed loop control system that is approximately independent of load current through output transistor 12, thus, approximately devoid of dependence on load current variations. It will be understood by those skilled in the art that some dependence will occur because of manufacturing tolerances, etc. but such dependencies typically is less than ten percent (10%). Such a damping factor maintains stability and optimum regulator performance at all load current levels at which voltage regulator 11 operates. It can also be mathematically shown that this relationship between the damping factor and the load current is applicable regardless of whether transistors 12 and 19 are MOS or Bipolar as will be shown hereinafter. Additionally, it should be noted that transistor 19 provides local negative feedback from output 14 via amplifier 41 and filter 50 to inputs 56 and 57 of amplifier 63 giving the combination a finite AC output conductance and thus a defined small signal AC voltage gain.

Transconductance stage 26 includes transistors 166 and 167 formed as a first differential pair or first differential stage that receives the feedback voltage on feedback input 59 and the reference voltage on input 58. A transistor 176 provides a constant current for the first differential amplifier. The current is developed by a current mirror formed from transistor 176 and a transistor 175 that receives a bias current from transistor 174. In response to the received feedback and reference voltages, transistors 166 and 167 supply currents to the inputs of a second differential trans impedance stage formed by transistors 168 and 169 and resistors 164 and 165. Resistors 164 and 165 form negative feedback loops with transistors 168 and 169, respectively, so the combined input currents flow through transistors 168 and 169 via the respective resistors form a balanced output voltage that is provided to driver amplifier 28. Consequently, trans impedance amplifier stage 27 effectively provides an output voltage that is responsive to the differential voltage between the reference voltage and the feedback voltage and also to the balanced currents from filter 50. The output voltage from transistors 168 and 169 of trans impedance amplifier stage 27 is coupled to the inputs of amplifier 28 that includes a third differential amplifier or differential pair that includes transistors 180 and 181. A transistor 182 provides a constant current source for transistors 180 and 181. The currents flowing through each of transistors 180 and 181 is received by current mirrors 184 and 188, respectively. Mirror 184 receives the current via a transistor 186 and couples it to a transistor 185 which mirrors the current to current a mirror 192 which reflects it through transistors 194 and 193 to a fourth current mirror formed from transistors 196, 197, 198, and 199. Current mirror 188 couples the current of transistor 181 to current mirrors comprised of transistors 201–204 which sums that current with the current from the fourth current mirror to generate a non-balanced current provided on output 61 to drive transistors 12 and 19.

Amplifier 63 implements the first differential stage by connecting a control electrode of transistor 166 to feedback input 59 and a control electrode of transistor 167 to reference input 58. Transistor 166 also has a first current carrying electrode connected to the first current carrying electrode of transistor 167 and to a first current carrying electrode of transistor 176. A second current carrying electrode of transistor 166 is connected to input 57, to a control electrode of transistor 168, a first current carrying electrode of transistor 170, and to a first terminal of resistor 164. A second current carrying electrode of transistor 167 is connected to a control electrode of transistor 169, to input 56, to a first current carrying electrode of transistor 173, and to a first terminal of resistor 165. Current mirror connected transistor 176 has a control electrode connected to the control electrode of transistor 175, to the first current carrying electrode of transistor 175, and to the first current carrying electrode of transistor 174. Differential pair comprising transistors 168 and 169 of the second differential trans impedance stage both have a first current carrying electrode connected together and to a first terminal of resistor 177. A second current carrying electrode of transistor 168 is connected to a second terminal of resistor 164, to a first current carrying electrode of current source transistor 171, and to an input of amplifier 28 via a connection to a control electrode of transistor 180. A second current carrying electrode of transistor 169 is connected to a second terminal of resistor 165, the first current carrying electrode of transistor 172 and to another input of amplifier 28 via a connection to a control electrode of transistor 181. The second terminal of resistor 177 and the second current carrying electrode of transistors 176 and 175 is connected to return 18. Additionally, the second current carrying electrode of transistors 170, 173, and 174 in addition the second current carrying electrode of current source connected transistors 171 and 172 is connected to node 23, and the control electrode of each is connected to bias output 60.

Driver amplifier 28 has transistors 180 and 181 having a second having a first current carrying electrode of each connected to a first current carrying electrode of transistor 182. A second current carrying electrode of transistor 180 is connected to a control electrode of transistors 185 and 186 in addition to a first current carrying electrode of transistor 186. A second current carrying electrode of transistor 181 is connected to a control electrode of transistors 189 and 190 in addition to a first current carrying electrode of transistor 189. Transistor 185 has a first current carrying electrode connected to the first current carrying electrode and a control electrode of transistor 194 in addition to a control of transistor 193. Transistor 190 has a first current carrying electrode connected to the control electrode of transistors 202 and 204 in addition to a first current carrying electrode of transistor 202.

Transistor 202 has a second current carrying electrode connected to the first current carrying electrode and the control electrode of transistor 201 in addition to the control electrode of transistor 203. A first current carrying electrode of transistor 203 is connected to a first current carrying electrode of transistor 204. The second current carrying electrode of transistor 204 is connected to output 61 and to a first current carrying electrode of transistor 198. A second current carrying electrode of transistor 198 connected to a first current carrying electrode of transistor 199. A control electrode of transistor 199 is connected to a control electrode and a first current carrying electrode of transistor 197 and to a first current carrying electrode of transistor 196. A control electrode of transistor 196 is connected to a second current carrying electrode of transistor 196, a control electrode of transistor 198, and a first current carrying electrode of transistor 193. The second current carrying electrode of transistors 197, 185, 186, 189, 190, and 199 is connected to return 18. The second current carrying electrode of transistors 193, 194, 182, 201, and 203, is connected to node 23.

Amplifier 63 also is formed to generate the bias voltage and provide the bias voltage on bias output 60. A transistor 161 receives the reference voltage from reference input 58 to a control electrode of transistor 161. Transistor 161 along with resistor 162 and transistor 163 generate the bias voltage and provide it on output 60. Transistor 161 has a first current carrying electrode connected to bias output 60 and to a first current carrying electrode and a control electrode of transistor 163. A second current carrying electrode of transistor 163 is connected to node 23. Transistor 161 produces a bias current for transistor 163. Additionally a control electrode of current source connected transistors 182 and 170–174 are connected output 60. Resistor 162 has a first terminal connected to a second current carrying electrode of transistor 161, and a second terminal connected to return 18.

As stated previously, without the inputs from filter 50, amplifier 63 attempts to maintain the output voltage fixed relative to the value of the reference voltage. It will be noted by those skilled in the art, that the outputs of filter 50 can be applied at a different place in amplifier 30 and achieve the same result. For instance, filter 50 outputs 53 and 54 can be applied to the input of another amplifier and converted to a single-ended voltage that drives transistors 12 and 19 in parallel with amplifier 63.

Figure 6:
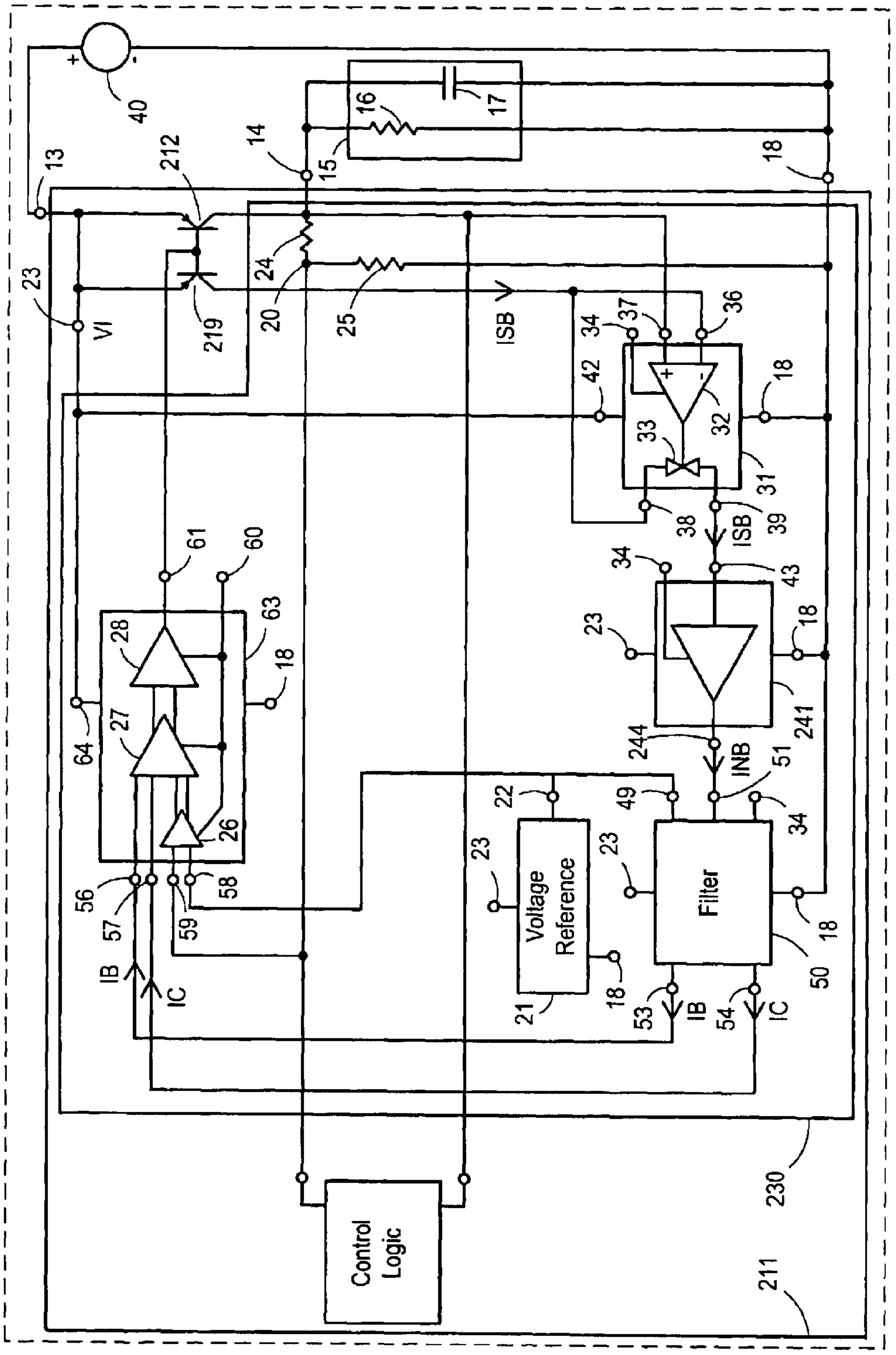
FIG. 6 schematically illustrates a functional diagram of a portion of an another embodiment of a system that includes a voltage regulator in accordance with the present invention.

FIG. 6 schematically illustrates a functional diagram of an embodiment of a system 210 that is an alternate embodiment of system 10 shown in FIG. 1. System 210 includes a voltage regulator 211 that has an amplifier 230 and a non-liner current amplifier 241. Amplifier 230 is an alternate embodiment of amplifier 30 shown in FIG. 1 and amplifier 241 is an alternate embodiment of amplifier 41 shown in FIG. 1. Regulator 211 also includes an output transistor 212 and a sense transistor 219 that are alternate embodiments of transistors 12 and 19 shown in FIG. 1. In this embodiment, transistors 212 and 219 are bipolar transistors. Transistors 212 and 219 are also rationed and typically have a ratio of at least 50:1 and preferably a ratio between about 100:1 and 1000:1. The transconductance of bipolar transistors has a different relationship to the load current flowing through them than the relationship of MOS transistors. Bipolar transistor transconductance varies linearly with the load current instead of the square root variation for MOS transistors. Consequently, amplifier 230 must implement a different algorithm in order to form a small signal AC gain that varies inversely as the square root of the transconductance the bipolar output transistor. The desired algorithm is provided by current amplifier 241.

Figure 7:
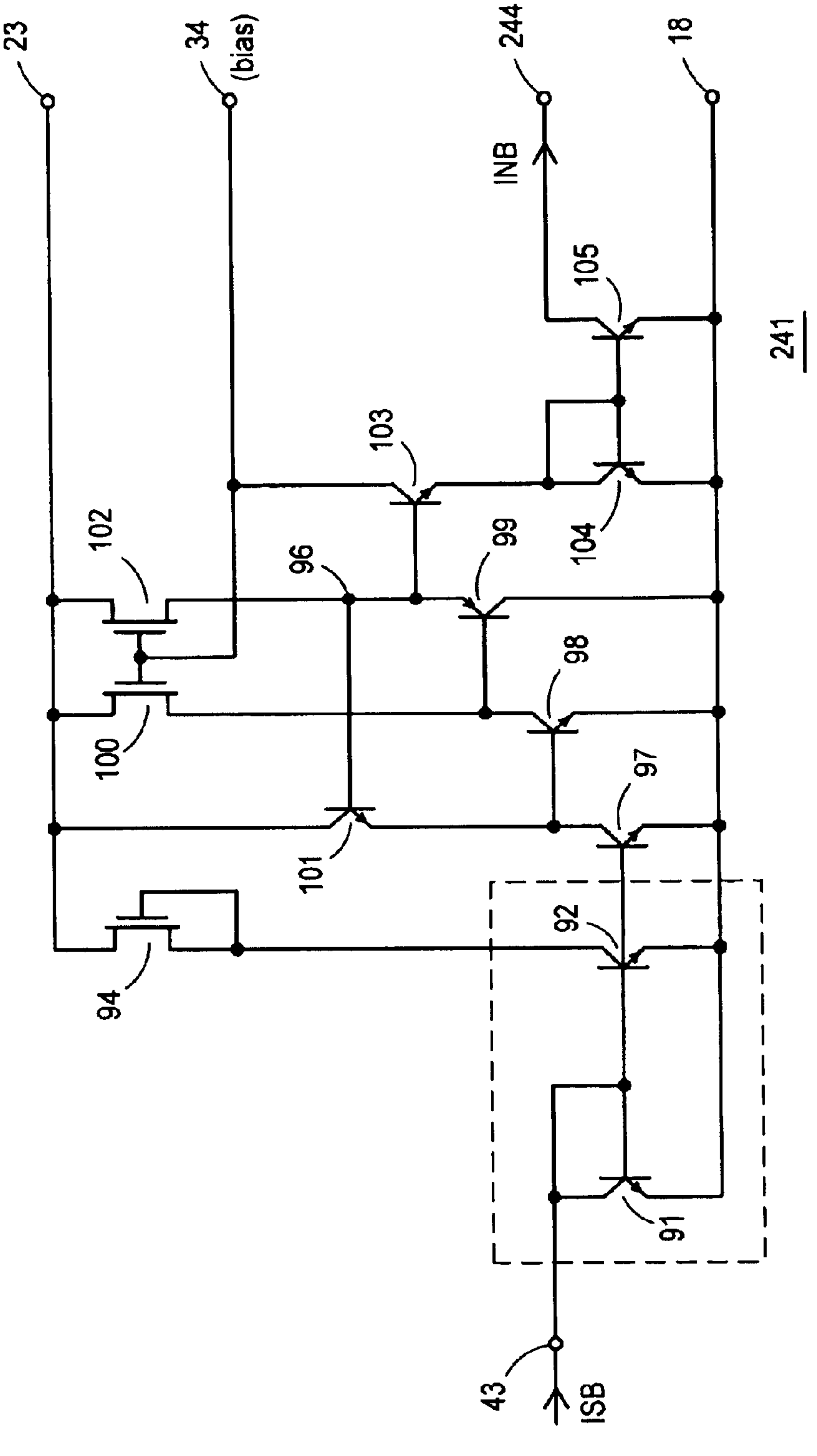
FIG. 7 schematically illustrates an embodiment of a portion of one of the functional blocks illustrated in FIG. 6 according to the present invention.

FIG. 7 schematically illustrates an embodiment of a portion of current amplifier 241 shown in FIG. 6. Amplifier 241 is a non-linear current amplifier, similar to the first stage of amplifier 41 shown in FIG. 3. Amplifier 241 is formed to generate a small signal gain which varies inversely as the Mth root of the sense current (ISB) received on input 43, thus, inversely as the Nth root of the load current. Amplifier 241 must provide a small signal gain which varies inversely as the square root of the sense current (ISB) received on input 43. This requires that the compensated current (INB) provided on output 244 of amplifier 241 vary according to the square root of the received sense current (ISB). Because the sense current (ISB) represents the load current multiplied by the scaling factors of transistors 212 and 219, the compensated current (INB) at output 244 varies as the square root of the load current through transistor 212. For the embodiment illustrated in FIG. 7 amplifier 241 has a transfer function expressed by:

$$INB=k(\text{½ root of }(ISB))=k(\text{½ root of }[(r)(ILB)])$$

where

INB=compensated output current of amplifier 241;

ISB=sense current provided by transistor 219 and equalizer 31;

ILB=load current flowing through transistor 212;

k=proportionality constant of amplifier 241; and r=ratio of sense current (ISB) to load current (ILB).

Differentiating the above equation provides the small-signal gain of amplifier 241 as:

$$GMB=(dINB)/(dISB)=[(\text{½})k][1/[\text{½ root of }(ISB)]]$$

where;

GMB=the small signal gain of amplifier 241;

dINB=incremental change in INB; and dIBS=incremental change in ISB

Consequently, the small signal gain of amplifier 241 varies inversely as the square root of the load current flowing through transistor 212. Elements that have the same element number as those in FIG. 4 have the same operation and connections.

While the invention is described with specific preferred embodiments, it is evident that many alternatives and variations will be apparent to those skilled in the semiconductor arts. More specifically the invention has been described for a particular PNP and NPN transistor structure, although the method is directly applicable to other bipolar transistors, as well as to MOS, BiCMOS, metal semiconductor FETS (MEETS), HFETS, and other transistor structures. Additionally, the functionality of the various elements may be moved to other of the elements as long as the functions of the control loop are implemented and the relationship to the output transistor and control elements is included.

What is claimed is:

1. A method of forming a voltage regulator semiconductor device circuit having feedback comprising:

forming the semiconductor device to have a small signal AC gain that varies inversely to a load current of the semiconductor device.

2. The method of claim 1 wherein forming the semiconductor device to have the small signal AC gain that varies inversely to the load current includes forming a control loop amplifier having the small signal AC gain that varies inversely to a load current.

3. The method of claim 1 wherein forming the semiconductor device to have the small signal AC gain that varies inversely to the load current of the semiconductor device includes forming the small signal AC gain in such manner as to compensate a dependence of a transconductance of an output transistor on the load current.

4. The method of claim 1 wherein forming the semiconductor device to have the small signal AC gain includes forming a control loop amplifier having the small signal AC gain.

5. The method of claim 1 wherein forming the semiconductor device to have the small signal AC gain that varies inversely to the load current includes forming the semiconductor device having a control loop having a damping factor that is approximately devoid of dependence on load current variations.

6. The method of claim 1 further including coupling an output transistor to provide the load current and coupling a sense transistor to have a sense current representative of the load current.

7. The method of claim 6 wherein coupling the sense transistor to have the sense current representative of the load current includes forming the semiconductor device to generate a sense transistor image voltage that is approximately equal to an output voltage formed by the semiconductor device.

8. The method of claim 1 wherein forming the semiconductor device to have the small signal AC gain that varies inversely to the load current includes forming the small signal AC gain to vary approximately inversely to an Nth root of the load current.

9. The method of claim 8 wherein forming the small signal AC gain to vary approximately inversely to the Nth root of the load current includes forming the Nth root to approximate a square root.

10. The method of claim 8 wherein forming the small signal AC gain to vary approximately inversely to the Nth root of the load current includes forming the Nth root to approximate a fourth root.

11. The method of claim 8 wherein forming the small signal AC gain to vary approximately inversely to the Nth root of the load current includes forming a non-linear current amplifier to generate an output current of the non-linear current amplifier that varies approximately as an Mth root of the load current.

12. The method of claim 11 wherein forming the non-linear current amplifier to generate the output current of the non-linear current amplifier that varies as the Mth root includes forming the Mth root to approximate a square root.

13. The method of claim 11 wherein forming the non-linear current amplifier to generate the output current of the non-linear current amplifier that varies as the Mth root includes forming the non-linear current amplifier to generate the output current of the non-linear current amplifier that varies as a three-fourths root of an input current to the non-linear current amplifier.

14. The method of claim 8 wherein forming the small signal AC gain to vary approximately inversely to the Nth root of the load current includes forming a high-pass filter to have a cut-off frequency that varies responsively to variations in an average value of the load current.

15. The method of claim 14 wherein forming the high-pass filter to have the cut-off frequency that varies responsively to variations in the average value of the load current includes forming the high-pass filter to have the cut-off frequency that varies approximately as a three-eights root of the average value of the load current.

16. The method of claim 14 wherein forming the high-pass filter to have the cut-off frequency that varies responsively to variations in the average value of the load current includes forming the high-pass filter to have the cut-off frequency that varies approximately as a fourth root of the load current.

17. A method of forming a voltage regulator comprising:

forming the voltage regulator to have a control loop formed to have a damping factor that is that is approximately independent of variations in a load current of the voltage regulator.

18. A voltage regulator comprising:

an output transistor coupled between a voltage source and an output of the voltage regulator, the output transistor coupled to produce an output voltage on the output and to produce a load current on the output;

a sense transistor having a first current carrying electrode coupled to the voltage source and a second current carrying electrode coupled to produce a sense current;

an equalizer coupled to receive the sense current and the output voltage and to force a voltage on the second current carrying electrode of the sense transistor that is approximately equal to the output voltage and coupled to provide the sense current at an output of the equalizer;

a non-linear current amplifier coupled to receive the sense current from the equalizer and to produce a compensated current that varies as an Nth root of the load current; and a high-pass filter having a out-off frequency that varies as an Nth root of an average value of the load current wherein the high-pass filter is coupled to receive the compensated current and provide a filter output current having variations at frequencies above the cut-off frequency.

19. The voltage regulator of claim 18 wherein the non-linear current amplifier has a gain that varies as an Mth root of the load current.

20. The voltage regulator of claim 19 wherein the Mth root is one selected from the group consisting of a three-fourths root and a square root.

* * * * *